United States Patent Office 3,065,289
Patented Nov. 20, 1962

3,065,289
SOLID-STATE CELL AND BATTERY
Harry C. Lieb, Rockville Centre, N.Y., assignor to Leesona Corporation, Cranston, R.I., a corporation of Massachusetts
No Drawing. Filed Jan. 5, 1959, Ser. No. 784,884
3 Claims. (Cl. 136—153)

This invention relates to primary electro-chemical cells, which consist entirely of solid components, and to solid-state batteries which comprise an assembly of such cells. In general, this invention is an improvement on the types of solid-state cells and batteries which are described and claimed in application Serial No. 730,059, filed by Harry C. Lieb and John A. De Rosa on April 22, 1958.

The identified application of Lieb and De Rosa explains that there are many present-day uses for solid-state batteries in applications which require a relatively high voltage but a relatively low total current. Typical applications would include circuitry in connection with transitors, radiation meters, as well as circuitry requiring a small light-weight source of voltage, where a long shelf life and reliable operation are imperative.

It has been recognized that the usefulness of solid-state batteries could be extended to other important applications on improvement of the total current characteristics. It has also been recognized that relatively low current densities which characterize solid-state cells and batteries is due to a large degree to the limited conductivity of the solid electrolytes employed. One of the objectives of the invention disclosed in the Lieb and De Rosa application identified above is the improvement of the current drain characteristics of solid-state batteries by modifying the conventional solid-state electrolytes by the addition thereto of tellurium. Lieb and De Rosa found that the addition of three to ten percent tellurium to the commonly used chloride and bromide solid electrolytes, and of three to fifteen percent of tellurium to the iodide solid electrolytes, provided a permanent improvement in the ionic conductivity of the electrolyte, thus providing an increase in the open circuit voltage and in the useful current produced by cells employing the modified electrolyte. It was also found that such modification of the solid electrolyte improved the polarization characteristics of the cell. The examples disclosed in the Lieb and De Rosa application are applicable here, since the present invention differs in but a single important respect. I have made the remarkable discovery that the current drain characteristics are improved threefold and the polarization characteristics improved, by controlling the purity of the tellurium which is added to the solid electrolyte. The unexpected nature of this development is indicated by the fact that it has been the practice in the past to improve the ionic conductivity of solid electrolytes by the addition of small amounts of additives or impurities.

To attain the improvements provided by this invention the solid electrolyte must be modified by the addition of metallic tellurium which is more than 99.1% pure. The advantages of the invention are best achieved by employing a tellurium which is 99.99%, or more, pure. In the past, a specification of the use of tellurium would involve tellurium with a purity of about 99%, as no significance was attached to further purification of the metal in any of its uses.

As indicated above, a solid-state electrolyte modified with tellurium, which is at least 99.1% pure, may be prepared as described in the above-identified Lieb and De Rosa application, and cells or batteries employing such electrolyte may be similarly prepared and assembled.

The following example is illustrative of the improvements provided by the invention:

Example 1

Five percent by weight of high-purity tellurium (99.999% pure) was added to a melt of C.P. silver bromide and maintained in an oven at 500° C. for one-half hour, to provide a solid electrolyte. A number of primary cells were prepared by first forming a silver anode foil coated by thermal fusion with this solid-state electrolyte. A cupric bromide cathode containing by weight ⅓ of a carbon-conductive mix was applied to the solid-state electrolyte. The active cell area was .2 square inch. The electrochemical system consisted of an anode of silver, of a silver bromide electrolyte containing 5% of high-purity tellurium and a cathode of cupric bromide, the electrochemical reaction being the conversion of silver to silver bromide. The open circuit voltage and the performance of these cells under drain were compared with similar cells made in an identical fashion, but using an electrolyte containing 5% of 99% pure tellurium.

| | First voltage, volts | Load resistance, ohms | Current, amps |
|---|---|---|---|
| 99.999= tellurium | .78 | $10^6$ | $7.8 \times 10^{-7}$ |
| | .68 | $10^5$ | $6.8 \times 10^{-7}$ |
| 99% tellurium | .76 | $10^6$ | $7.6 \times 10^{-6}$ |
| | .68 | $3 \times 10^5$ | $2.27 \times 10^{-7}$ $_{-6}$ |

It was noted that at the same voltage (.68) the cells containing 99.999% tellurium permitted a current drain approximately three times greater than obtained from the other set of cells.

The ionic conductivity of the electrolyte containing 99.999% tellurium was measured both using an A.C. bridge at 1,000 cycles and a D.C. bridge, and found to be at least three times greater than the ionic conductivity of a similar electrolyte using tellurium of 99% purity.

A biclad material was prepared by rolling a halide electrolyte containing the high-purity tellurium onto silver foil. The thickness of the silver foil was .002 inch, the thickness of the electrolyte was .002 inch and single cells were prepared comprising as an anode and electrolyte this biclad material, and as a cathode a mixture of cupric bromide and conductive carbon (⅓ by weight). The area of these cells was 0.44 inch.

When these cells were drained under a load sufficient to drop the open circuit voltage by 10%, drains approximately three times greater than those achievable with single cells using a 99% purity tellurium were achieved (142 microamps, compared to 40 microamps.).

Cells of this area prepared with an electrolyte containing 99% pure telliurium show rapid polarization under continuous drain, polarizing at a current drain of 50 microamps. No polarization effects were noted in identical cells using 99.999% tellurium at current drains of 800 microamps.

Having thus described the invention, what I claim as new is:

1. An electrochemical cell having a solid electrolyte consisting essentially of a metal halide selected from the group consisting of chlorides, bromides and iodides and 3–10%, by weight, of tellurium, the tellurium employed being at least 99.1% pure.

2. An electrochemical cell having a silver anode, a cupric bromide cathode and a solid electrolyte consisting essentially of silver bromide and 3–10%, by weight, of tellurium, the tellurium employed being at least 99.9% pure.

3. An electrochemical cell having a solid electrolyte consisting essentially of a metal halide selected from the group consisting of chlorides, bromides and iodides and more than 3% to less than 15% tellurium, the tellurium employed being at least 99.1% pure.

References Cited in the file of this patent

UNITED STATES PATENTS

| | | |
|---|---|---|
| 2,602,095 | Faus | July 1, 1952 |
| 2,930,830 | Lieb et al. | Mar. 29, 1960 |